(12) United States Patent
Charles et al.

(10) Patent No.: US 8,783,028 B2
(45) Date of Patent: Jul. 22, 2014

(54) EGR PERFORMANCE BALANCING RESTRICTOR FOR AN ENGINE SYSTEM

(75) Inventors: Eric J. Charles, Peoria, IL (US); Matthew F. Fahrenkrug, Chillicothe, IL (US); David E. Gorisek, Mark, IL (US)

(73) Assignee: Caterpillar Inc., Peoria, IL (US)

(*) Notice: Subject to any disclaimer, the term of this patent is extended or adjusted under 35 U.S.C. 154(b) by 381 days.

(21) Appl. No.: 13/210,780

(22) Filed: Aug. 16, 2011

(65) Prior Publication Data

US 2013/0042610 A1 Feb. 21, 2013

(51) Int. Cl.
- F02B 33/44 (2006.01)
- F02M 25/07 (2006.01)
- F01N 3/10 (2006.01)
- F01N 1/00 (2006.01)

(52) U.S. Cl.
USPC .......... 60/605.2; 60/324; 60/308; 123/568.27

(58) Field of Classification Search
USPC ........ 60/605.2, 324, 308; 123/568.21, 568.27
IPC .................................................... F02M 25/07
See application file for complete search history.

(56) References Cited

U.S. PATENT DOCUMENTS

| | | | |
|---|---|---|---|
| 1,217,615 A * | 2/1917 | McDowell | 181/262 |
| 2,937,490 A * | 5/1960 | Calvert | 60/286 |
| 2,967,518 A | 1/1961 | Zuhn | |
| 3,043,096 A * | 7/1962 | McLoughlin | 60/286 |
| 3,657,878 A * | 4/1972 | Kaufmann, Jr. | 60/308 |
| 4,023,365 A * | 5/1977 | van Ginhoven | 60/324 |
| 6,014,961 A | 1/2000 | Gates | 123/568.27 |
| 6,138,652 A | 10/2000 | Cook et al. | 123/568.27 |
| 6,263,672 B1 | 7/2001 | Roby et al. | 60/605.2 |
| 6,354,084 B1 * | 3/2002 | McKinley et al. | 60/605.2 |
| 6,526,752 B2 * | 3/2003 | McKinley et al. | 60/605.2 |
| 6,973,787 B2 * | 12/2005 | Klingel | 60/605.2 |
| 7,257,950 B2 | 8/2007 | Iwaszkiewicz | 60/605.2 |
| 7,356,987 B2 * | 4/2008 | Kiser et al. | 60/280 |
| 2002/0100280 A1* | 8/2002 | McKinley et al. | 60/605.2 |
| 2007/0039322 A1* | 2/2007 | Bering et al. | 60/605.2 |
| 2007/0084194 A1* | 4/2007 | Holm | 60/612 |
| 2010/0170225 A1* | 7/2010 | Opris et al. | 60/286 |

* cited by examiner

Primary Examiner — Thai Ba Trieu
(74) Attorney, Agent, or Firm — Liell & McNeil

(57) ABSTRACT

An engine system includes an exhaust gas recirculation conduit having an inlet in fluid communication with an exhaust conduit and an outlet in fluid communication with an intake air conduit. An exhaust gas recirculation performance balancing restrictor has an uninstalled position wherein the exhaust conduit defines a first backpressure at the inlet of the exhaust gas recirculation conduit. The exhaust gas recirculation performance balancing restrictor also has an installed position in which the exhaust gas recirculation performance balancing restrictor is removably disposed within the exhaust conduit downstream from the inlet of the exhaust gas recirculation conduit. In the installed position, the exhaust gas recirculation performance balancing restrictor provides a fixed flow restriction through the exhaust conduit to generate a second backpressure at the inlet of the exhaust gas recirculation conduit that is greater than the first backpressure.

13 Claims, 4 Drawing Sheets

EGR PERFORMANCE BALANCING RESTRICTOR FOR AN ENGINE SYSTEM

TECHNICAL FIELD

The present disclosure relates generally to an engine system having an exhaust gas recirculation (EGR) conduit, and more particularly to an EGR performance balancing restrictor removably disposed within an exhaust conduit downstream from an EGR conduit inlet for providing a fixed flow restriction to generate an increased backpressure at the EGR conduit inlet.

BACKGROUND

EGR is commonly used in engine systems to help reduce engine gas emissions, such as nitrogen oxides ($NO_x$). $NO_x$ is formed at high combustion temperatures and, when combined with hydrocarbons, leads to the production of smog. In an engine system employing EGR, a portion of exhaust gases are recirculated from the exhaust system to the intake system. Since exhaust gases have already combusted, they do not burn again when they are recirculated. As such, the inert exhaust gases displace some of the intake air to effectively slow and cool the combustion process and, thus, reduce $NO_x$ formation.

Precise control of recirculation flow may be desired since, for example, too much flow may retard engine performance, while too little flow may result in increased $NO_x$ production. Backpressure within the exhaust system, particularly in the vicinity of the EGR conduit, may impact the amount of flow through the EGR system, with a relatively high backpressure resulting in too much flow through the EGR system and a relatively low backpressure resulting in too little flow through the EGR system. Tuning engines to achieve desired recirculation flow may be further complicated by the fact that, due to manufacturing tolerances, even engines of the same model may experience different pressures and, thus, may exhibit varying recirculation flow.

U.S. Pat. No. 6,263,672 to Roby et al. discloses the use of an EGR valve and a restrictor valve in an engine system. The EGR valve provides a means for controlling the flow of recirculated exhaust gas to be provided to an intake passageway in response to an input from a controller. The restrictor valve is positioned upstream from a turbocharger turbine and restricts the flow of exhaust gas into the turbine. This restriction results in an increase in pressure of the exhaust gas provided to the restrictor valve. The higher pressure exhaust gas is provided to the inlet of the EGR valve, which may be actuable independently of the actuation of the restrictor valve. Although potentially effective, such an arrangement employs the use of electronically controlled valves, which may be costly and complex.

The present disclosure is directed to one or more of the problems set forth above.

SUMMARY OF THE DISCLOSURE

In one aspect, an engine system includes an exhaust gas recirculation conduit having an inlet in fluid communication with an exhaust conduit and an outlet in fluid communication with an intake air conduit. An exhaust gas recirculation performance balancing restrictor has an uninstalled position wherein the exhaust conduit defines a first backpressure at the inlet of the exhaust gas recirculation conduit. The exhaust gas recirculation performance balancing restrictor also has an installed position in which the exhaust gas recirculation performance balancing restrictor is removably disposed within the exhaust conduit downstream from the inlet of the exhaust gas recirculation conduit. In the installed position, the exhaust gas recirculation performance balancing restrictor provides a fixed flow restriction through the exhaust conduit to generate a second backpressure at the inlet of the exhaust gas recirculation conduit which is greater than the first backpressure.

In another aspect, a method of adjusting a backpressure at an inlet of an exhaust gas recirculation conduit of an engine system includes a step of measuring a pressure along an exhaust conduit to determine a first backpressure at the inlet of the exhaust gas recirculation conduit. An exhaust gas recirculation performance balancing restrictor is selected to provide a fixed flow restriction through the exhaust conduit to generate a second backpressure at the inlet of the exhaust gas recirculation conduit that is greater than the first backpressure. The exhaust gas recirculation performance balancing restrictor is then removably disposed within the exhaust conduit downstream from the inlet of the exhaust gas recirculation conduit.

In yet another aspect, an exhaust gas recirculation performance balancing restrictor for use in an engine system includes a disk-shaped body. A fixed orifice through the disk-shaped body defines a reduced exhaust flow area that is less than a flow area defined by an exhaust conduit of the engine system. A periphery of the disk-shaped body defines an outer diameter substantially equal to an inner diameter of the exhaust conduit. The exhaust gas recirculation performance balancing restrictor has an installed position wherein the exhaust gas recirculation performance balancing restrictor is removably disposed within the exhaust conduit downstream from an inlet of an exhaust gas recirculation conduit and provides a fixed flow restriction through the exhaust conduit to generate a second backpressure at the inlet of the exhaust gas recirculation conduit which is greater than a first backpressure defined by the exhaust conduit.

DETAILED DESCRIPTION

Figure 1:
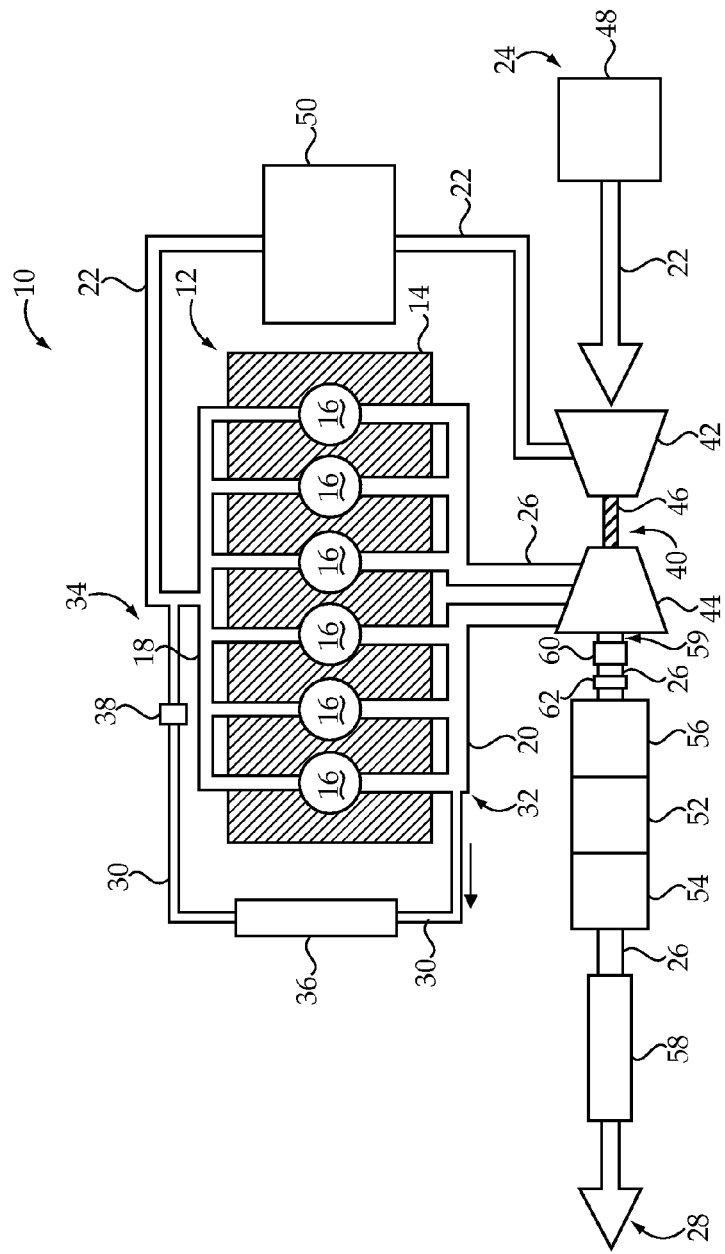
FIG. 1 is a schematic of an engine system including an EGR conduit, according to the present disclosure.

Referring to FIG. 1, there is shown a schematic view of an engine system 10, according to the present disclosure. The engine system 10 includes an internal combustion engine 12, which, for purposes of illustration, and not limitation, is that of a four-stroke, compression ignition engine and includes an engine block 14 defining a plurality of combustion chambers or cylinders 16. The internal combustion engine 12 may be any type of engine (e.g., internal combustion, gas, diesel, gaseous fuel, natural gas, propane, etc.), may be of any size, with any number of cylinders, any type of combustion chamber (e.g., cylindrical, rotary spark ignition, compression ignition, 4-stroke and 2-stroke, etc.), and in any configuration (e.g., "V," in-line, radial, etc.). In the exemplary internal combustion engine 12, six combustion chambers 16 are shown, however, those skilled in the art will appreciate that any number of combustion chambers may be applicable. The internal combustion engine 12 also includes an intake manifold 18 in communication with the combustion chambers 16 and capable of providing air to the internal combustion engine 12, and an exhaust manifold 20 also in communication with the combustion chambers 16 and capable of expending exhaust gas from the engine block 14.

Generally speaking, the engine system 10 includes an intake air conduit 22, or passageway, extending from an air inlet 24 to the intake manifold 18, and an exhaust conduit 26, or passageway, extending from the exhaust manifold 20 to an exhaust outlet 28. An EGR conduit 30, or passageway, may have an inlet 32 in fluid communication with the exhaust conduit 26 and an outlet 34 in fluid communication with the intake air conduit 22, and may provide a path for a portion of the exhaust expended through the exhaust conduit 26 to be rerouted to the intake manifold 18 via the intake air conduit 22. The EGR conduit 30 may also include an EGR cooler 36 positioned at any location along the EGR conduit 30 and configured to cool recirculated exhaust gases. An EGR valve 38 may be positioned along the EGR conduit 30 and may be configured to selectively regulate an exhaust flow through the EGR conduit 30. The EGR valve 38 may be any type of valve configured to open or close off the EGR conduit 30, such that the position of the EGR valve 38 may determine the flow rate through the EGR conduit 30. As should be appreciated, the EGR valve 38 may be actuated using any known actuation means, with the actuation means being controlled electronically or otherwise.

The engine system 10 also includes a turbocharger of standard design, shown generally at 40. Although one turbocharger is shown in the illustrated embodiment, it is known that more than one turbocharger, positioned in series or parallel, may be used in the engine system 10. The turbocharger 40 includes a compressor 42, disposed along the intake air conduit 22, connected to a turbine 44, disposed along the exhaust conduit 26 downstream from the inlet 32 of the EGR conduit 30, via a shaft 46. Exhaust gas leaving the exhaust manifold 20 passes through the exhaust conduit 26 and to a wheel of the turbine 44 to make it rotate. The rotation of the wheel turns the shaft 46, which, in turn, rotates a wheel of the compressor 42. The rotation of the compressor wheel pulls in ambient air through the intake air conduit 22 and compresses it. As should be appreciated, the ambient air may be filtered using one or more air filters 48.

The compressed, or charged, intake air may be very hot and, thus, it may be desirable to route the compressed intake air through a heat exchanger, such as an air-to-air after cooler (ATAAC) 50. The ATAAC 50 may be configured to cool the intake air in the intake air conduit 22 prior to induction into the internal combustion engine 12. The ATAAC 50 may be of standard design and may be positioned at any location along the intake air conduit 22 for receiving ambient air, which may, according to some embodiments, be pushed or drawn through the ATAAC 50 using a fan. It should be appreciated that in order to comply with environmental regulations, especially regulations regarding $NO_x$ production, it may be desirable to maintain the temperature of the air passing into the intake manifold 18 below a predetermined temperature, such as, for example, about 70° Celsius.

The engine system 10 also includes one or more aftertreatment components disposed along the exhaust conduit 26. According to the exemplary embodiment, the engine system 10 may include a plurality of aftertreatment components. For example, the aftertreatment components may include a catalyst-based device 52. The catalyst-based device 52 may include a catalyst configured to convert, such as via oxidation or reduction, one or more gaseous constituents of the exhaust gas produced by the internal combustion engine 12 to a more environmentally friendly gas and/or compound to be discharged into the atmosphere. For example, the catalyst may be configured to chemically alter at least one component of the exhaust flow. Catalyst-based device 52 may be configured for one or more various types of conversion, such as, for example, selective catalytic reduction (SCR), diesel oxidation (e.g., a diesel oxidation catalyst, DOC), and/or adsorption of nitrous oxides ($NO_x$; e.g., a $NO_x$ adsorber).

The engine system 10 may also include a particulate trap, such as, for example, a diesel particulate filter (DPF) 54. The DPF 54 may include any type of aftertreatment device configured to remove one or more types of particulate matter, such as soot and/or ash, from an exhaust flow of the internal combustion engine 12. The DPF 54 may include a filter medium configured to trap the particulate matter as the exhaust gas flows through it. The filter medium may consist of a mesh-like material, a porous ceramic material (e.g., cordierite), or any other material and/or configuration suitable for trapping particulate matter. One or more particulate filters, similar to DPF 54, may also be disposed along the EGR conduit 30 for a similar purpose. Regenerating means, such as well known active and/or passive regeneration means, may also be provided to periodically or continuously oxidize trapped particulate matter in the DPF 54. A regeneration system, which may also be generally referred to as an aftertreatment component, is shown generally at 56.

According to the exemplary embodiment, the engine system 10 may also include a muffler 58 for reducing the amount of noise emitted by the exhaust of the internal combustion engine 12. The muffler 58, as referenced herein, may also be referred to generally as an aftertreatment component. It should be appreciated that the engine system 10 may include any number and/or combination of aftertreatment components, such as components 52, 54, 56, 58, for treating or otherwise affecting the exhaust, and, further, any one or more aftertreatment components may be packaged together within a common module. Although the aftertreatment components 52, 54, 56, 58 are shown positioned downstream from the turbine 44 of the turbocharger 40, it should be appreciated that one or more of the components 52, 54, 56, 58 may be positioned upstream from the turbine 44. Further, similar and/or additional components may be positioned along the EGR conduit 30.

As stated above, a portion of the exhaust gases may be routed back into the intake air conduit 22 along the EGR conduit 30. According to the exemplary embodiment, the inlet 32 of the EGR conduit 30 may be positioned upstream from the turbine 44 and, thus, the system may generally be referenced as a high pressure EGR system. However, the present disclosure is also applicable to low pressure EGR systems in which the exhaust gas is drawn from downstream of the turbine 44 and diverted back to the intake manifold 18. According to some embodiments, the EGR inlet 32 may be positioned downstream of the DPF 54 and/or other aftertreatment components. It should also be appreciated that, according to alternative embodiments, the recirculated exhaust gases may be introduced into the intake air conduit 22 upstream from the ATAAC 50, or other heat exchanger, and/or any filters 48, if desired. The specific embodiment shown is provided for exemplary purposes only, and it should be appreciated that various modifications to the components and configurations shown are contemplated.

As is known in the art, the engine system 10 may also include various sensors and/or devices for monitoring and controlling the engine system 10. Monitored parameters may be determined directly or indirectly based on measurements taken throughout the system 10. Such an indirectly based determination may be referred to as a virtual sensor. For example, temperatures, pressures, condensation, etc. at various locations in the engine system 10 may be determined, directly or indirectly, to assess operating conditions of one or more components of the engine system 10 and, if desired, make control decisions based thereon. Although numerous sensors and devices are contemplated, a particular sensor for measuring pressure at or near an outlet 59 of the turbine 44 of the turbocharger 40 is shown generally at 60. A specific use for the pressure sensor 60 will be described below.

The engine system 10 may also include an EGR performance balancing restrictor 62, which may be removably disposed within the exhaust conduit 26 downstream from the inlet 32 of the EGR conduit 30. According to the exemplary embodiment, the EGR performance balancing restrictor 62 may also be positioned downstream from the turbine 44 of the turbocharger 40, and upstream from the aftertreatment components 52-58. However, according to alternative embodiments, the EGR performance balancing restrictor 62 may be positioned at any position along the exhaust conduit 26 downstream from the inlet 32 of the EGR conduit 30. It should be appreciated that the EGR performance balancing restrictor 62 is fully removable and is not an integral component of any portion of the exhaust system. However, while the engine system 10 may function without the EGR performance balancing restrictor 62, it may not function at an optimal state.

Figure 2:
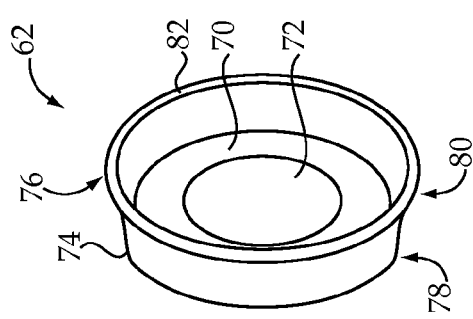
FIG. 2 is a perspective view of an exemplary embodiment of an EGR performance balancing restrictor that may be used with the engine system of FIG. 1, according to one aspect of the present disclosure.

Turning now to FIG. 2, an exemplary embodiment of the EGR performance balancing restrictor 62 will be discussed in greater detail. According to the exemplary embodiment, the EGR performance balancing restrictor 62 may generally include a disk-shaped body 70 defining a fixed orifice 72 and a substantially cylindrical wall 74 extending axially from a periphery 76 of the disk-shaped body 70. As shown, the cylindrical wall 74 has a first edge 78 adjacent the periphery 76 of the disk-shaped body 70 and a second edge 80 having a rim 82 extending radially outward from the second edge 80. Although the performance balancing restrictor 62 has been described as having a substantially cylindrical wall 74, alternative embodiments include configurations wherein the wall may be frustoconical. Further, although the EGR performance balancing restrictor 62 may be made from various materials having differing chemistries, it should be appreciated that a relatively hard material, such as a metal or alloy, including iron or steel, may provide durability. For example, the selected material should be capable of sufficiently withstanding high exhaust gas temperatures.

Figure 4:
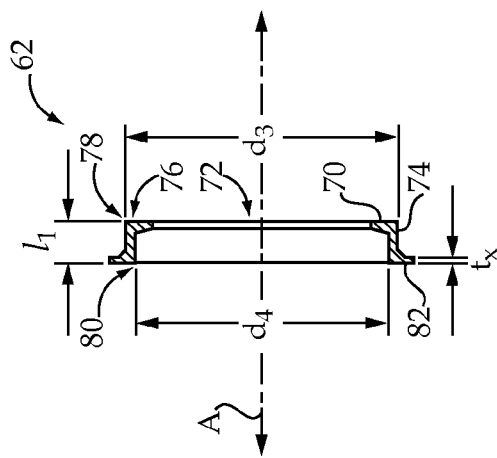
FIG. 4 is cross sectional view taken along lines 4-4 of FIG. 3.
Figure 3:
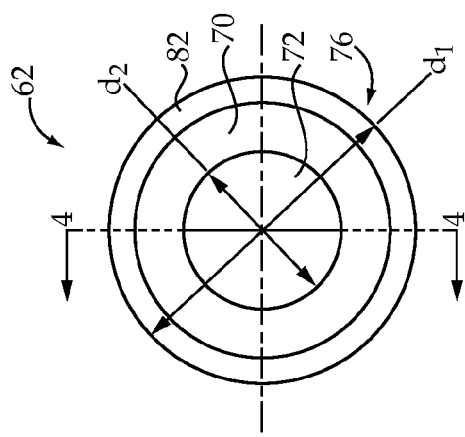
FIG. 3 is a side view of the EGR performance balancing restrictor of FIG. 2.

A side view of the EGR performance balancing restrictor 62 is shown in FIG. 3. According to a particular application, the EGR performance balancing restrictor 62 may have an overall diameter, or outer diameter, $d_1$ of between about 90 millimeters (mm) and about 125 mm. The fixed orifice 72, defined by the disk-shaped body 70, may have a diameter $d_2$ of between about 50 mm and about 95 mm. Referring now to FIG. 4, the outer diameter $d_3$ of the cylindrical wall 74 may be between about 80 mm and 115 mm, while the inner diameter $d_4$ of the cylindrical wall 74 may be between about 70 mm and 110 mm and may vary depending on a desired thickness of the cylindrical wall 74. An axial length $l_1$ of the cylindrical wall 74 may be between about 15 mm and 35 mm. An axial thickness tx of the rim 82 may be between about 2.5 mm and 10 mm and, according to some embodiments, may represent a uniform thickness. Further, thicknesses of the cylindrical wall 74 and the disk-shaped body 70 may be similar to or different from the thickness tx of the rim 82. The cylindrical wall 74, according to some embodiments, may taper outwardly from the first edge 78 toward the second edge 80 to aid in manufacturing and/or assembly. Although a circular EGR performance balancing restrictor 62 is shown, it should be appreciated that the restrictor 62 may have various shapes, depending on the particular application. Further, although a substantially flat or planar disk-shaped body 70 is shown, the body 70 may be concave or convex, if desired.

Figure 5:
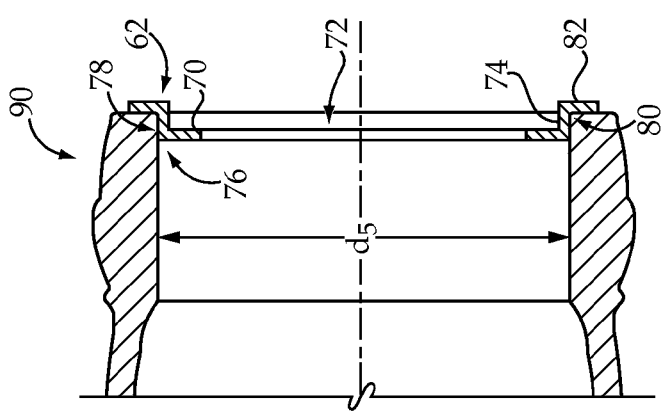
FIG. 5 is a cross sectional view of the EGR performance balancing restrictor of previous FIGS. 2-4 removably disposed within an inlet of an exemplary aftertreatment component, according to another aspect of the present disclosure.

The EGR performance balancing restrictor 62 may have an uninstalled position in which the restrictor 62 is not positioned within the engine system 10 and the exhaust conduit 26 defines a first backpressure at the inlet 32 of the EGR conduit 30. According to an installed position of the EGR performance balancing restrictor 62, as shown in FIG. 5, the EGR performance balancing restrictor 62 is removably disposed within the exhaust conduit 26 downstream from the inlet 32 of the EGR conduit 30. In the installed position, the EGR performance balancing restrictor 62 provides a fixed flow restriction through the exhaust conduit 26 to generate a second backpressure at the inlet 32 of the EGR conduit that is greater than the first backpressure. Specifically, the fixed orifice 72 may define a reduced exhaust flow area that is less than a flow area defined by the exhaust conduit 26, thus increasing the pressure upstream from the EGR performance balancing restrictor 62 and, particularly, at the inlet 32 of the EGR conduit 30.

As used herein, a "fixed" flow restriction may refer to a flow restriction that is relatively constant or unchanging, as opposed to a "variable" flow restriction, which may be selectively changed. A variable flow restriction, for example, may be provided by a valve, variable geometry turbine, or other similar device that, when disposed within a conduit, may selectively change a flow area therethrough. Thus, the EGR performance balancing restrictor 62 of the present disclosure, which provides a fixed flow restriction, is different than a valve, variable geometry turbine, or other similar variable flow restriction device.

According to a particular embodiment, and as shown in FIG. 5, the EGR performance balancing restrictor 62 may be removably disposed, or positioned such that it is capable of being removed, within an aftertreatment component inlet 90. The aftertreatment component inlet 90 may, for example, be an inlet of one of the aftertreatment components 52, 54, 56, 58 described herein. For example, the outer diameter $d_3$ of the cylindrical wall 74 may be substantially equal to, or slightly smaller than, an inner diameter of the exhaust conduit 26 and/or, more specifically, an inner diameter $d_3$ of the aftertreatment component inlet 90. As such, the EGR performance balancing restrictor 62 may be press fit within the aftertreatment component inlet 90. Further, the rim 82 may be used to position the EGR performance balancing restrictor 62 a desired distance within the aftertreatment component inlet 90.

Figure 7:
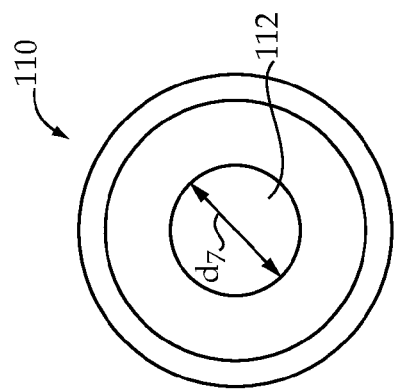
FIG. 7 is a side view of another EGR performance balancing restrictor similar to the restrictor of FIGS. 2-5 and similar to the restrictor of FIG. 6, but having a unique orifice size, according to another aspect of the present disclosure.
Figure 6:
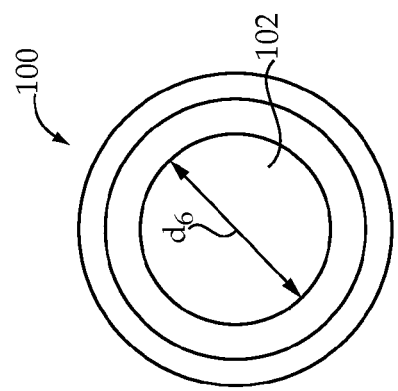
FIG. 6 is a side view of an EGR performance balancing restrictor similar to the restrictor of FIGS. 2-5, but having a unique orifice size, according to another aspect of the present disclosure.

Turning now to FIGS. 6 and 7, a plurality of EGR performance balancing restrictors, similar to restrictor 62, may be provided, with each of the plurality of EGR performance balancing restrictors having a unique orifice size. For example, an alternative EGR performance balancing restrictor 100 may have a fixed orifice 102 defining a diameter $d_6$ that is larger than the diameter $d_2$ of EGR performance balancing restrictor 62. The EGR performance balancing restrictor 100 may be similar to the restrictor 62 in all respects except the orifice size and, thus, will not be discussed in detail. By providing a larger orifice 102, the EGR performance balancing restrictor 100 may provide less flow restriction than the EGR performance balancing restrictor 62, but still more flow restriction than the exhaust conduit 26 itself. Thus, less backpressure may be created at the EGR conduit inlet 32 than that generated by the restrictor 62. An EGR performance balancing restrictor 110, shown in FIG. 7, having a fixed orifice 112 defining a diameter $d_7$ that is smaller than the diameter $d_2$ of EGR performance balancing restrictor 62 may produce more flow restriction and, thus, greater backpressure at inlet 32 than both of restrictors 62 and 100.

Figure 8:
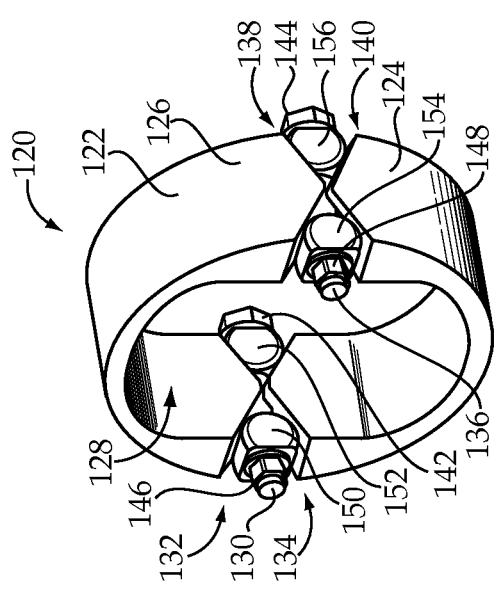
FIG. 8 is a perspective view of an alternative embodiment of an EGR performance balancing restrictor that may be used with the engine system of FIG. 1, according to another aspect of the present disclosure.

Turning to FIG. 8, an alternative embodiment of an EGR performance balancing restrictor is shown at 120. The alternative EGR performance balancing restrictor 120 generally includes a pair of arc-shaped segments 122, 124 defining a disk-shaped body 126, similar to the disk-shaped body 70 described above. In particular, the disk-shaped body 126 includes a fixed orifice 128 defining a reduced exhaust flow area that is less than a flow area defined by the exhaust conduit 26. The reduced exhaust flow area may increase the pressure upstream from the EGR performance balancing restrictor 62 and, particularly, at the inlet 32 of the EGR conduit 30, thus increasing the flow through the EGR conduit 30. Similar to the embodiment described above, the alternative EGR performance balancing restrictor 120 may be provided with varying orifice sizes, depending on the particular applications.

According to the embodiment of FIG. 8, a first fastener 130 is disposed between first ends 132, 134 of the pair of arc-shaped segments 122, 124 and a second fastener 136 is disposed between second ends 138, 140 of the pair of arc-shaped segments 122, 124. For example, the fasteners 130 and 136 may include bolts 142, 144 and nuts 146, 148, as shown. A pair of size adjustment fittings 150, 152 and 154, 156 may be disposed around each of the respective fastener 130 and 136, and may be shaped to urge the arc-shaped segments 122, 124 radially outward as the fasteners 130 and 136 are tightened. In particular, the pairs of fittings 150, 152 and 154, 156 may be positioned on opposing ends of the respective fasteners 130 and 136 and may be wedge-shaped to engage complementary surfaces of the ends 132, 134 and 138, 140 of the arc-shaped segments 122, 124.

Figure 9:
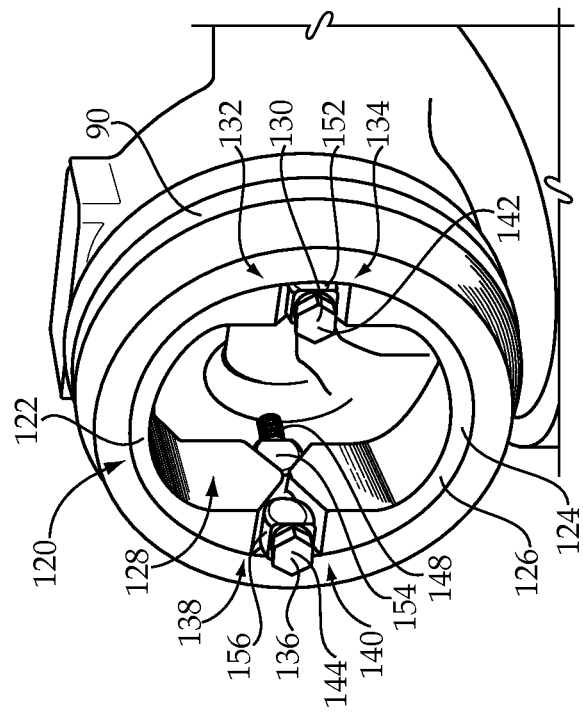
FIG. 9 is a perspective view of the EGR performance balancing restrictor of FIG. 8 removably disposed within an aftertreatment component inlet, according to another aspect of the present disclosure.

According to a particular application, and as shown in FIG. 9, the alternative EGR performance balancing restrictor 120 may be removably disposed within the aftertreatment component inlet 90. The aftertreatment component inlet 90 may, as described above, be an inlet of one of the aftertreatment components 52-58 described herein. For example, an outer diameter of the arc-shaped segments 122, 124 may, in an uninstalled position, be slightly less than an inner diameter of the exhaust conduit 26 and/or, more specifically, the inner diameter $d_5$ of the aftertreatment component inlet 90 (shown in FIG. 5). Once positioned within the aftertreatment component inlet 90, the fasteners 130 and 136 may be tightened to urge the arc-shaped segments 122, 124 radially outward and secure an interference fit within the inlet 90.

INDUSTRIAL APPLICABILITY

The present disclosure may be applicable to engine systems having an EGR conduit. Further, the present disclosure may be applicable to engine systems utilizing both an EGR conduit and a turbocharger. Yet further, the present disclosure may be applicable to such engine systems that also require a cost effective means of adjusting EGR flow to balance engine efficiency and performance with emissions reductions.

Referring generally to FIGS. 1-9, an engine system 10 may include an internal combustion engine 12 having an engine block 14 defining a plurality of combustion chambers or cylinders 16. An intake system may generally include an intake air conduit 22 extending from an air inlet 24 to an intake manifold 18, with an air filter 48, compressor 42 of a turbocharger 40, and ATAAC 50 disposed along the conduit 22. The engine system 10 may be configured to route exhaust gases produced by the internal combustion engine 12 away from the engine 12 via the exhaust conduit 26, which may be configured to direct the exhaust flow from the internal combustion engine 12 through the turbine 44 of the turbocharger 40, through aftertreatment components 52, 54, 56, 58, and ultimately release the exhaust flow to the atmosphere through the exhaust outlet 28.

An EGR conduit 30 may include a recirculation flowpath configured to route a portion of exhaust gases from the exhaust conduit 26 back to the internal combustion engine 12. The EGR flowpath may include the EGR conduit 30 and portions of the intake air conduit 22. In some embodiments, the EGR flowpath may be configured to divert a portion of the exhaust gases from the exhaust conduit 26 from a location upstream from the aftertreatment devices 52-58 and the turbine 44. In order to recirculate a portion of the exhaust gases into the intake air conduit 22, a particular pressure, or backpressure, within the exhaust conduit 26 may be required. However, many additional factors, including, for example, intake air pressure, engine speed, turbo boost pressure, etc., may influence the EGR flow rate.

During engine manufacture, or at any point thereafter, it may be desirable to install an EGR performance balancing restrictor, such as restrictor 62 or restrictor 120, within the engine system 10 to adjust the flow of exhaust gases along the EGR conduit 30. For example, a first backpressure at the inlet 32 of the EGR conduit 30 may be determined, such as by measuring a pressure at or near an outlet 59 of the turbine 44 of the turbocharger 40 using a pressure sensor 60. Based on the pressure measurement, and considering any additional factors, an EGR performance balancing restrictor, such as one of restrictors 62, 100, and 110 or restrictor 120, may be selected to provide a fixed flow restriction through the exhaust conduit 26 to generate a second backpressure at the inlet 32 of the EGR conduit 30 that is greater than the first backpressure. Specifically, this selection may include identifying a desired backpressure increase based on at least one of an emissions characteristic, such as a $NO_x$ measurement, and an efficiency characteristic, such as a fuel consumption measurement.

The selection of an EGR performance balancing restrictor 62, 100, 110 may include the selection of a restrictor from a plurality of EGR performance balancing restrictors. For example, according to the embodiment of FIGS. 2-7, the plurality of EGR performance balancing restrictors 62, 100, 110 may each have a unique orifice size that may correspond to the desired increase in backpressure. Once the appropriate EGR performance balancing restrictor 62, 100, 110 is selected, the restrictor may be removably disposed within the exhaust conduit 26 downstream from the inlet 32 of the EGR conduit 30. According to a particular embodiment, the EGR performance balancing restrictor 62, 100, 110 may be positioned downstream from the turbine 44 of the turbocharger 40 and upstream from one or more of the aftertreatment components 52, 54, 56, 58. More specifically, it may be desirable to position the EGR performance balancing restrictor 62, 100, 110 within an aftertreatment component inlet 90.

The pressure may again be measured at or near the outlet 59 of the turbine 44 of the turbocharger 40 after the EGR performance balancing restrictor 62, 100, 110 has been installed. If the desired backpressure at the EGR conduit inlet 32, as determined by the turbine outlet pressure, is not achieved, it may be desirable to replace the EGR performance balancing restrictor 62, 100, 110 with a different exhaust gas recirculation performance balancing restrictor 62, 100, 110 to generate a third backpressure at the inlet of the exhaust gas recirculation conduit which is different than the second backpressure. For example, this backpressure may be greater than or less than the second backpressure. By adjusting the backpressure at the EGR conduit inlet 32 using the EGR performance balancing restrictor 62, 100, 110, more precise control of the recirculation flow may be achieved. Utilizing the EGR performance balancing restrictor 62, 100, 110 disclosed herein offers a cost effective means for controlling recirculation flow, particularly when compared to the conventional means for controlling recirculation flow, which include the use of relatively costly and complex control valves, variable geometry turbochargers, and control strategies therefore.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method of adjusting a backpressure at an inlet of an exhaust gas recirculation conduit of an engine system to improve at least one of an emission characteristic and an efficiency characteristic, the engine system including an internal combustion engine having an intake manifold and an exhaust manifold, an intake air conduit extending from an air inlet to the intake manifold, an exhaust conduit extending from the exhaust manifold to an exhaust outlet, the exhaust gas recirculation conduit having the inlet in fluid communication with the exhaust conduit and an outlet in fluid communication with the intake air conduit, and an aftertreatment component disposed along the exhaust conduit downstream from the exhaust manifold, the method comprising:
   measuring a pressure in the exhaust conduit with a pressure sensor to determine a first backpressure at the inlet of the exhaust gas recirculation conduit prior to installation of an exhaust gas recirculation performance balancing restrictor;
   selecting and removably disposing the exhaust gas recirculation performance balancing restrictor within the exhaust conduit downstream from the exhaust manifold to provide a fixed flow restriction through the exhaust conduit to generate a second backpressure at the inlet of the exhaust gas recirculation conduit which is greater than the first backpressure.

2. The method of claim 1, wherein the selecting step includes identifying a desired backpressure increase based on at least one of an emissions characteristic and an efficiency characteristic associated with the desired backpressure increase.

3. The method of claim 2, wherein the selecting step further includes selecting the exhaust gas recirculation performance balancing restrictor from a plurality of exhaust gas recirculation performance balancing restrictors, wherein each of the plurality of exhaust gas recirculation performance balancing restrictors has a unique orifice size.

4. The method of claim 1, wherein the removably disposing step includes positioning the exhaust gas recirculation performance balancing restrictor downstream from a turbine of a turbocharger.

5. The method of claim 4, wherein the removably disposing step further includes positioning the exhaust gas recirculation performance balancing restrictor upstream from the aftertreatment component.

6. The method of claim 4, wherein the removably disposing step further includes positioning the exhaust gas recirculation performance balancing restrictor within an inlet of the aftertreatment component.

7. The method of claim 6, wherein the removably disposing step further includes press fitting the exhaust gas recirculation performance balancing restrictor within the inlet of the aftertreatment component.

8. The method of claim 1, wherein the measuring step includes measuring a pressure at an outlet of a turbine of a turbocharger to determine the first backpressure.

9. The method of claim 8, further including:
   measuring the pressure at the outlet of the turbine after the removably disposing step; and
   replacing the exhaust gas recirculation performance balancing restrictor with a different exhaust gas recirculation performance balancing restrictor, which defines a different sized fixed orifice therethrough, configured to generate a third backpressure at the inlet of the exhaust gas recirculation conduit which is different than the second backpressure.

10. An exhaust gas recirculation performance balancing restrictor being installed in an engine system, the engine system including an internal combustion engine having an intake manifold and an exhaust manifold, an intake air conduit extending from an air inlet to the intake manifold, an exhaust conduit extending from the exhaust manifold to an exhaust outlet and having a pressure sensor therein, the exhaust gas recirculation conduit having the inlet in fluid communication with the exhaust conduit and an outlet in fluid communication with the intake air conduit, and an aftertreatment component disposed along the exhaust conduit downstream from the inlet of the exhaust gas recirculation conduit, wherein the exhaust conduit defines a first backpressure at the inlet of the exhaust gas recirculation conduit prior to installation of an exhaust gas recirculation performance balancing restrictor, the exhaust gas recirculation performance balancing restrictor comprising:
   a disk-shaped body;
   a fixed orifice through the disk-shaped body defining a reduced exhaust flow area that is less than a flow area defined by the exhaust conduit; and
   a periphery of the disk-shaped body defining an outer diameter substantially equal to an inner diameter of the exhaust conduit;
   wherein the exhaust gas recirculation performance balancing restrictor has an installed position wherein the exhaust gas recirculation performance balancing restrictor is removably disposed within the exhaust conduit downstream from the inlet of the exhaust gas recirculation conduit and provides a fixed flow restriction through the exhaust conduit to generate a second backpressure at the inlet of the exhaust gas recirculation conduit which is greater than the first backpressure.

11. The exhaust gas recirculation performance balancing restrictor of claim 10, further including a cylindrical wall extending axially from the periphery of the disk-shaped body.

12. The exhaust gas recirculation performance balancing restrictor of claim 11, wherein the cylindrical wall includes a first edge adjacent the periphery of the disk-shaped body and a second edge having a rim extending radially outward.

13. The exhaust gas recirculation performance balancing restrictor of claim 10, further including:
- a pair of arc-shaped segments defining the disk-shaped body;
- a first fastener disposed between first ends of the pair of arc-shaped segments and a second fastener disposed between second ends of the pair of arc-shaped segments; and
- a first size adjustment fitting disposed around the first fastener and a second size adjustment fitting disposed around the second fastener, wherein the first and second size adjustment fittings are shaped to urge the arc-shaped segments radially outward as the first and second fasteners are tightened.

* * * * *

UNITED STATES PATENT AND TRADEMARK OFFICE
CERTIFICATE OF CORRECTION

PATENT NO. : 8,783,028 B2  
APPLICATION NO. : 13/210780  
DATED : July 22, 2014  
INVENTOR(S) : Charles et al.

Page 1 of 1

It is certified that error appears in the above-identified patent and that said Letters Patent is hereby corrected as shown below:

In the Claims

Column 10, line 1, in Claim 2, delete "emissions" and insert -- emission --.

Signed and Sealed this  
Fifteenth Day of September, 2015

Michelle K. Lee  
*Director of the United States Patent and Trademark Office*